United States Patent
Li et al.

(10) Patent No.: US 8,271,729 B2
(45) Date of Patent: Sep. 18, 2012

(54) READ AND WRITE AWARE CACHE STORING CACHE LINES IN A READ-OFTEN PORTION AND A WRITE-OFTEN PORTION

(75) Inventors: Jian Li, Austin, TX (US); Ramakrishnan Rajamony, Austin, TX (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 12/562,242

(22) Filed: Sep. 18, 2009

(65) Prior Publication Data

US 2011/0072214 A1   Mar. 24, 2011

(51) Int. Cl.
*G06F 12/00* (2006.01)
(52) U.S. Cl. . 711/118; 711/124; 711/133; 711/E12.001; 711/E12.023
(58) Field of Classification Search .................. 711/100, 711/118, 124, 130, 133, E12.001, E12.017, 711/E12.023
See application file for complete search history.

(56) References Cited

U.S. PATENT DOCUMENTS

| | | |
|---|---|---|
| 7,293,141 B1 | 11/2007 | Donley |
| 2006/0112228 A1 | 5/2006 | Shen |
| 2006/0206670 A1 | 9/2006 | Tanoue |
| 2010/0115204 A1* | 5/2010 | Li et al. .................. 711/130 |

OTHER PUBLICATIONS

International Search Report and Written Opinion dated Dec. 15, 2010 for International Application No. PCT/EP2010/062735, 10 pages.
Hardavellas, Nikos "Near-Optimal Cache Block Placement with Reactive Nonuniform Cache Architectures", IEEE Micro, IEEE Service Center, vol. 30, No. 1, Jan. 1, 2010, pp. 20-29.
Kim, Changkyu et al., "Nonuniform Cache Architectures for Wire-Delay Dominated On-Chip Caches", IEEE, MICRO 2004, Nov./Dec. 2003, pp. 99-107.

* cited by examiner

*Primary Examiner* — Jasmine Song
(74) *Attorney, Agent, or Firm* — Stephan R. Tkacs; Stephen J. Walder, Jr.; Libby Z. Toub

(57) ABSTRACT

A mechanism is provided in a cache for providing a read and write aware cache. The mechanism partitions a large cache into a read-often region and a write-often region. The mechanism considers read/write frequency in a non-uniform cache architecture replacement policy. A frequently written cache line is placed in one of the farther banks. A frequently read cache line is placed in one of the closer banks. The size ratio between read-often and write-often regions may be static or dynamic. The boundary between the read-often region and the write-often region may be distinct or fuzzy.

12 Claims, 4 Drawing Sheets

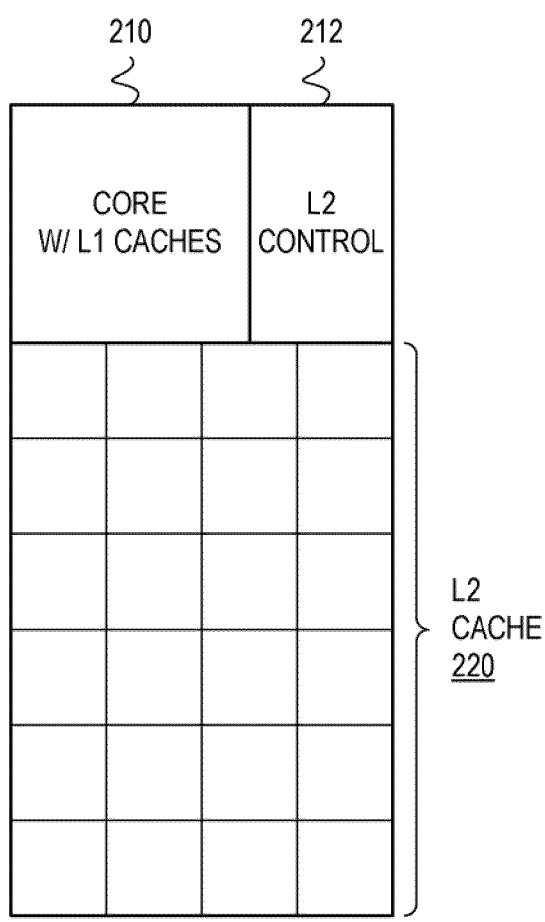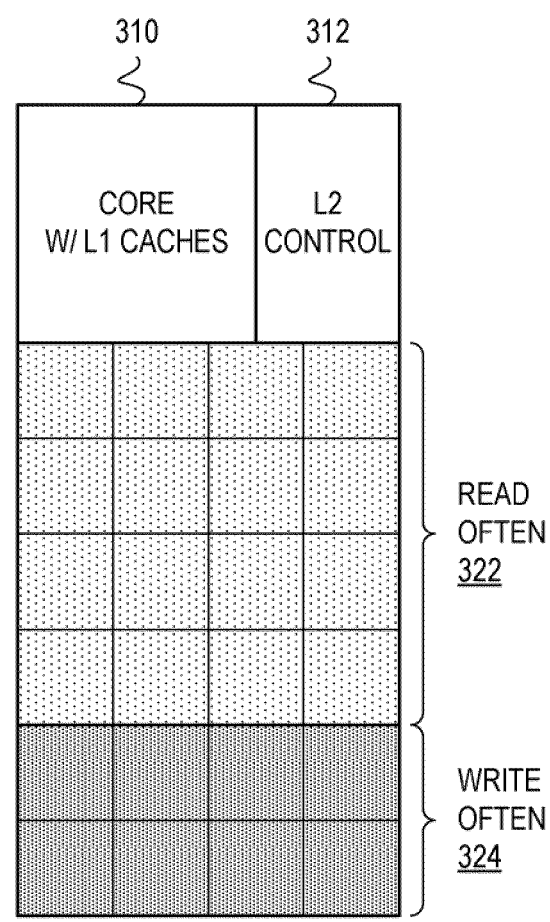

READ AND WRITE AWARE CACHE STORING CACHE LINES IN A READ-OFTEN PORTION AND A WRITE-OFTEN PORTION

BACKGROUND

The present application relates generally to an improved data processing apparatus and method, and more specifically to an apparatus and method for providing a read- and write-aware cache.

A cache is used to speed up data transfer and serve as staging areas for data. Memory caches speed up instruction execution, data retrieval and data updating, and their contents are constantly changing. A memory cache, or "CPU cache," is a memory bank that bridges main memory and the central processing unit (CPU). A memory cache is faster than main memory and allows instructions to be executed and data to be read and written more quickly. Instructions and data are transferred from main memory to the cache in fixed blocks, known as cache "lines."

Not all parts of a large cache can be accessed from a given point (such as a CPU) with the same latency. Non-uniform cache architectures (NUCA) have therefore arisen as an emerging cache architecture for large cache designs. In a NUCA design, the cache is partitioned into multiple banks that have different access delays from an access point (such as a CPU) due to where the banks are placed, differing wire delays and latencies. Intelligently managing the differing latency characteristics found in NUCA improves the performance of memory systems.

In a Dynamic NUCA (D-NUCA) design, a line is typically placed into any one of the banks. D-NUCA may use non-traditional cache placement and data movement policies to put frequently accessed data in closer banks. A first bank is defined as "closer" than a second bank if the first bank has a shorter latency to the processing unit than the second bank. Thus data may be accessed more quickly from the closer bank.

SUMMARY

In one illustrative embodiment, a method, in a data processing system, is provided for a read- and write-aware cache. The method comprises receiving a cache access request in a cache controller from a processing unit. If the cache access request is a load and results in a cache miss, the cache controller loads the cache line of data into a read-often region of the cache. The cache comprises an array of banks wherein the read-often region comprises banks that are close in proximity to the processing unit. The method further comprises the cache controller storing the results of a cache store miss into a write-often region of the cache. The write-often region comprises banks that are far in proximity to the processing unit.

In other illustrative embodiments, a computer program product comprising a computer useable or readable medium having a computer readable program is provided. The computer readable program, when executed on a computing device, causes the computing device to perform various individual and combinations of the operations outlined above with regard to the method illustrative embodiment.

In yet another illustrative embodiment, an apparatus is provided for a read- and write-aware cache. The apparatus comprises a processing unit, a cache array comprising an array of banks, and a cache controller coupled to the cache array and the processing unit. The array of banks comprises a read-often region and a write-often region. The read-often region comprises banks in the array of banks that are close in proximity to a processing unit. The write-often region comprises banks in the array of banks that are farther away from the processing unit. The cache controller is configured to receive a cache access request from the processing unit. If the access is a load resulting in a cache miss, the cache controller loads a cache line of data into the read-often region. The cache controller is further configured that on a store resulting in a cache miss, the cache line of data is placed into the write-often region of the cache.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is a block diagram illustrating a non-uniform cache architecture in which aspects of the illustrative embodiments may be implemented;

FIG. 3 is a block diagram illustrating a read- and write-aware non-uniform cache architecture in accordance with an illustrative embodiment;

DETAILED DESCRIPTION

The illustrative embodiments provide a mechanism for providing a read and write aware cache. The mechanism partitions a large cache into a read-often region and a write-often region. The mechanism considers read/write frequency in a non-uniform cache architecture replacement policy. A write-often cache line is placed in one of the farther banks. A read-often cache line is placed in one of the closer banks. The size ratio between read-often and write-often regions may be static or dynamic. The boundary between the read-often region and the write-often region may be distinct or fuzzy.

Figure 1:
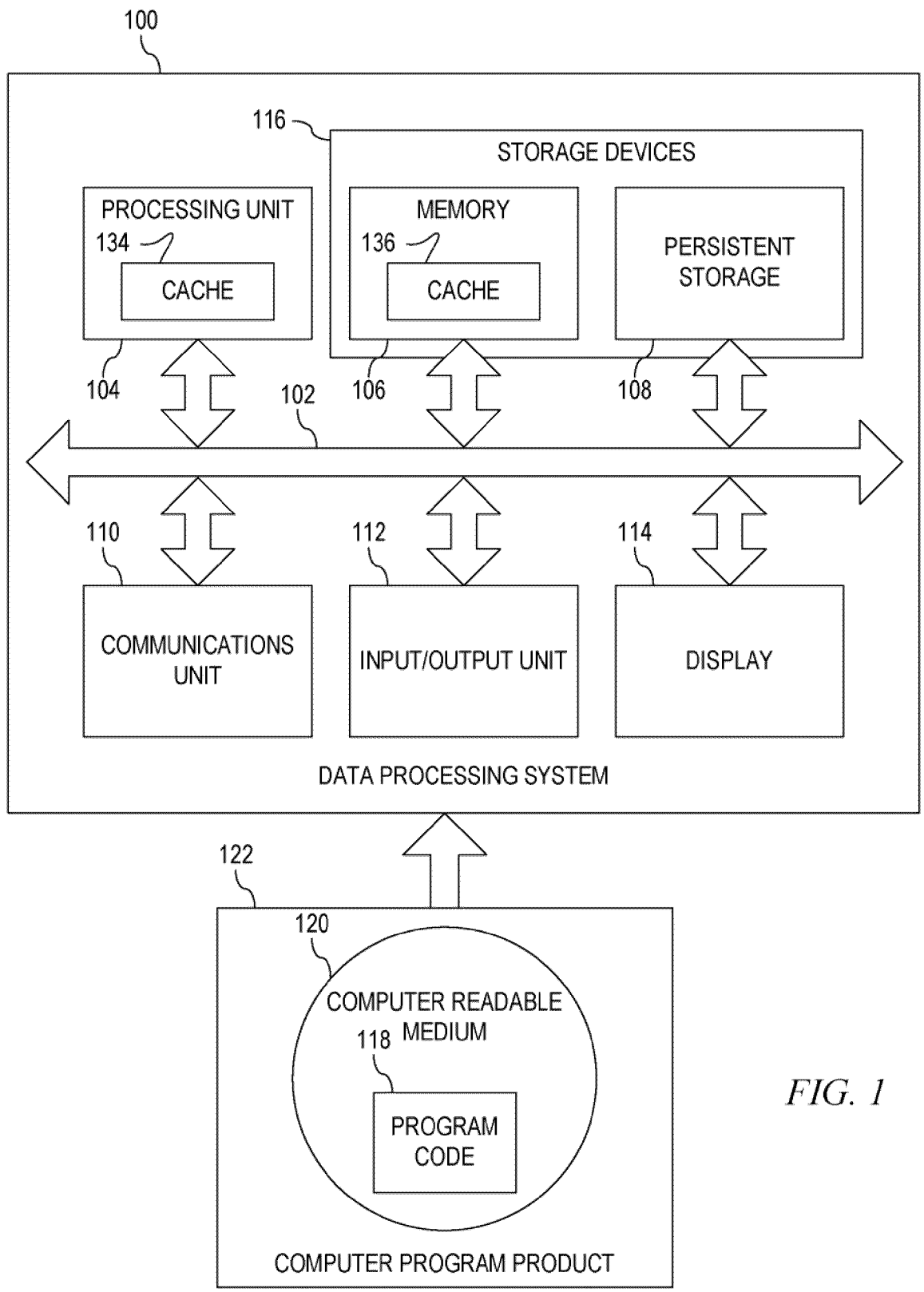
FIG. 1 is a block diagram of a data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a block diagram of a data processing system in which aspects of the illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Processing unit 104 may have cache 134. Cache 134 may be a level 0 (L0) and/or level 1 (L1) cache. Memory 106 may have cache 136, which may be, for example, a level 2 (L2) cache. Memory 106 may be a shared memory that is shared among a plurality of threads or a plurality of processing units. Therefore, cache 136 may be a shared cache.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable medium 120 that is selectively removable and may be loaded onto or transferred to data processing system 100 for execution by processor unit 104. Program code 118 and computer readable medium 120 form computer program product 122 in these examples. In one example, computer readable medium 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable medium 120 also may take the form of a persistent storage, such as a hard drive, a thumb drive, or a flash memory that is connected to data processing system 100. The tangible form of computer readable medium 120 is also referred to as a computer recordable storage medium. In some instances, computer readable medium 120 may not be removable.

Alternatively, program code 118 may be transferred to data processing system 100 from computer readable medium 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code.

As another example, a storage device in data processing system 100 is any hardware apparatus that may store data.

Memory 106, persistent storage 108 and computer readable medium 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

FIG. 2 is a block diagram illustrating a non-uniform cache architecture in which aspects of the illustrative embodiments may be implemented. The non-uniform cache architecture (NUCA) comprises a core 210 with level 1 (L1) caches, a level 2 (L2) cache controller 212, and a L2 cache array 220. In accordance with an illustrative embodiment, L2 cache controller 212 treats reads and writes differently, because reads are more sensitive to cache access latency than writes. Thus, L2 cache controller 212 considers read/write frequency when allocating a new cache line in L2 cache 220 or when moving a cache line in L2 cache 220.

FIG. 3 is a block diagram illustrating a read- and write-aware non-uniform cache architecture in accordance with an illustrative embodiment. The non-uniform cache architecture (NUCA) comprises a core 310 with L1 caches, a L2 cache controller 312, and a L2 cache array that is divided into a read-often region 322 and a write-often region 324. L2 cache controller 312 considers read/write frequency in the NUCA. L2 cache controller 312 places frequently written cache lines in one of the farther banks in write-often region 324 and places frequently read cache lines in one of the closer banks in read-often region 322. Furthermore, for NUCA replacement, L2 cache controller 312 moves frequently written cache lines to the farther banks in write-often region 324 and moves frequently read lines to the closer banks in read-often region 322.

The size ratio between read-often region 322 and write-often region 324 may be static or dynamic. That is, read-often region 322 and write-often region 324 may be set to static sizes based on general read/write frequency ratio information. For example, the closer two-thirds of the cache array may be configured to be the read-often region 322 while the farther one-third of the cache array may be configured to be the write-often region 324. Alternatively, L2 cache controller 312 may consider read/write frequency information and dynamically reconfigure read-often region 322 and write-often region 324. For example, L2 cache controller 312 may dynamically reconfigure read-often region 322 and write-often region 324 based on the runtime ratio of read-often and write-often cache lines. In one example embodiment, L2 cache controller 312 may start allocating cache lines for read-often region 322 starting from the front (closer banks) of the cache array and may start allocating cache lines for write-often region 324 from the back (farther banks) of the cache array. In this example embodiment, the boundary between read-often region 322 and write-often region 324 may be fuzzy, whereas in other embodiments, the boundary between read-often region 322 and write-often region 324 may be fixed or static.

In an example embodiment, L2 cache controller 312 may receive read/write frequency information through software. For example, software may provide special bits in load and store instructions that indicate read/write frequency information kept by the software. Software may also store special bits for read/write frequency information in page table entries. In another example embodiment, software may use special cache instructions, such as prefetch cache line for read or prefetch cache line for write, with read/write frequency information.

Alternatively, L2 cache controller 312 may detect read/write frequency in hardware. For example, a prefetch engine (not shown) may detect read streams and write streams. L2 cache controller 312 may keep a saturation counter per cache line to detect frequently read and frequently written cache lines.

In accordance with an illustrative embodiment, L2 cache controller 312 may extend known replacement policies for the read- and write-aware cache. For example, for a write miss, L2 cache controller 312 may replace the farthest cache line in the X least recently used (LRU) cache lines, where X may be a value from 2 to the cache associativity. For a read miss, L2 cache controller 312 may replace the closest line in the X LRU cache lines. As another example, for a frequently read cache line, L2 cache controller 312 may replace the LRU line in the read-often region 322, and for a frequently written cache line, L2 cache controller 312 may replace the LRU line in the write-often region 324.

In accordance with an illustrative embodiment, L2 cache controller 312 may extend known data movement policies for the read- and write-aware cache. For example, using generational promotion, L2 cache controller 312 may simply not swap a cache line into a closer bank after a write hit. These extensions to data movement policies results in reduced data movement, which reduces power consumption. As a more proactive extension of data movement policies, a frequently written cache line may trigger a swap to move the frequently read cache line to a farther bank.

Figure 4:
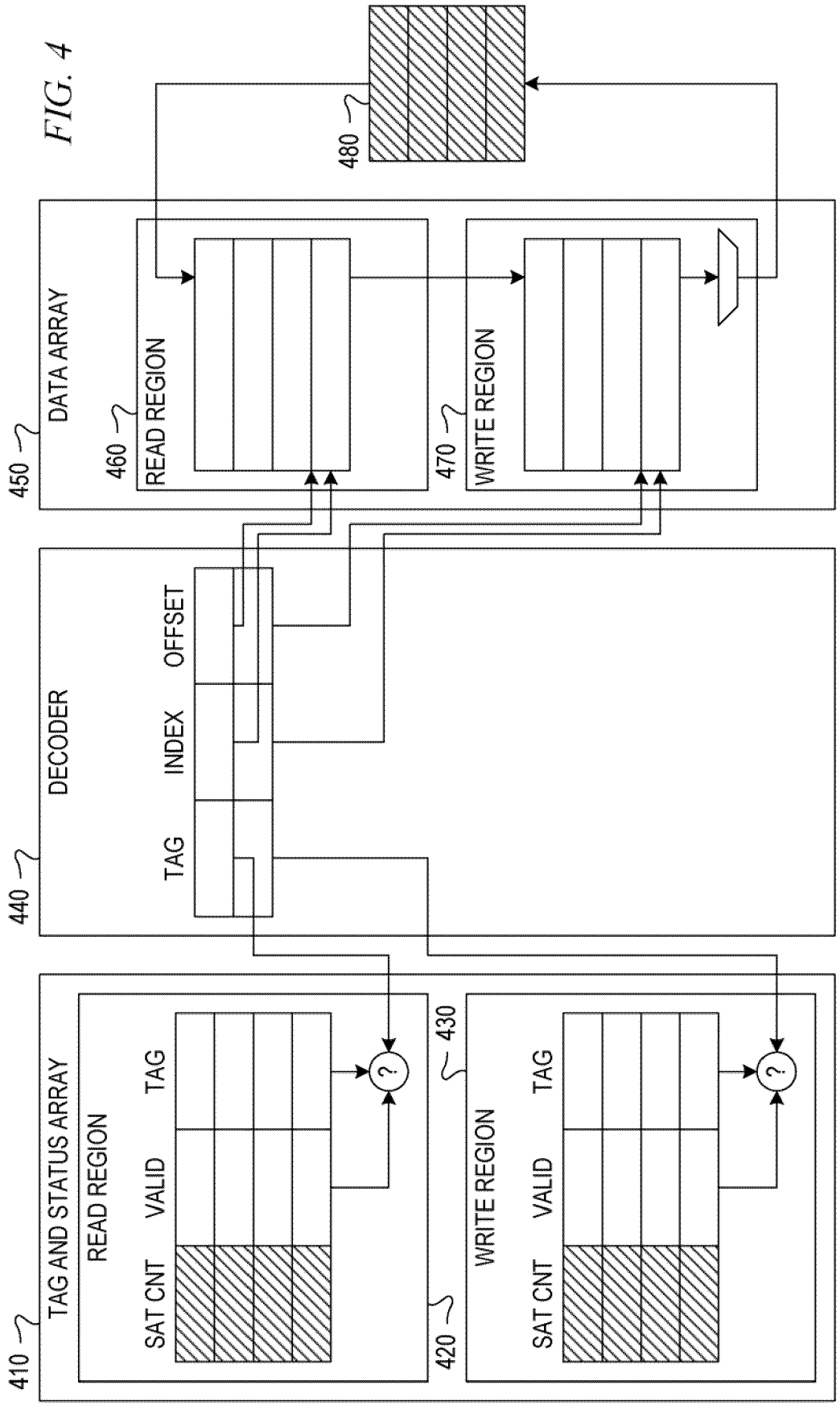
FIG. 4 is a block diagram illustrating hardware support for read- and write-aware cache in accordance with an illustrative embodiment.

FIG. 4 is a block diagram illustrating hardware support for read- and write-aware cache in accordance with an illustrative embodiment. Tag and status array 410 comprises a tag and status array for the read region 420 and a tag and status array for the write region 430. The tag and status array for read region 420 comprises a saturation counter (sat cnt), a valid bit, and a tag for each cache line in the read-often region of the cache. Similarly, the tag and status array for the write region 430 comprises a saturation counter, a valid bit, and a tag for each cache line in the write-often region of the cache. Data array 450 comprises read region 460 and write region 470.

Decoder 440 decodes addresses for reads and writes to the cache. An address for a cache access may comprise a tag, an index, and an offset. The tag and status array for the read region 420 compares the tag. If the tags match and the valid bit is set for a cache line in the tag and status array for read region 420, then the cache access results in a cache hit in the read region 460. Similarly, the tag and status array for the write region 430 compares the tag. If the tags match and the valid bit is set for the cache line in the tag and status array for write region 430, then the cache access results in a hit in the write region 470.

For a hit in the tag and status array for read region 420, decoder 440 accesses cache lines in read-often region 460 using the index and offset. For a hit in the tag and status array for write region 430, decoder 440 access cache lines in write-often region 470 using the index and offset. Frequently read cache lines that are frequently written to may be moved from read-often region 460 to write-often region 470. Frequently written cache lines that are then frequently read may be moved from write-often region 470 to read-often region 460 via swap buffer 480.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
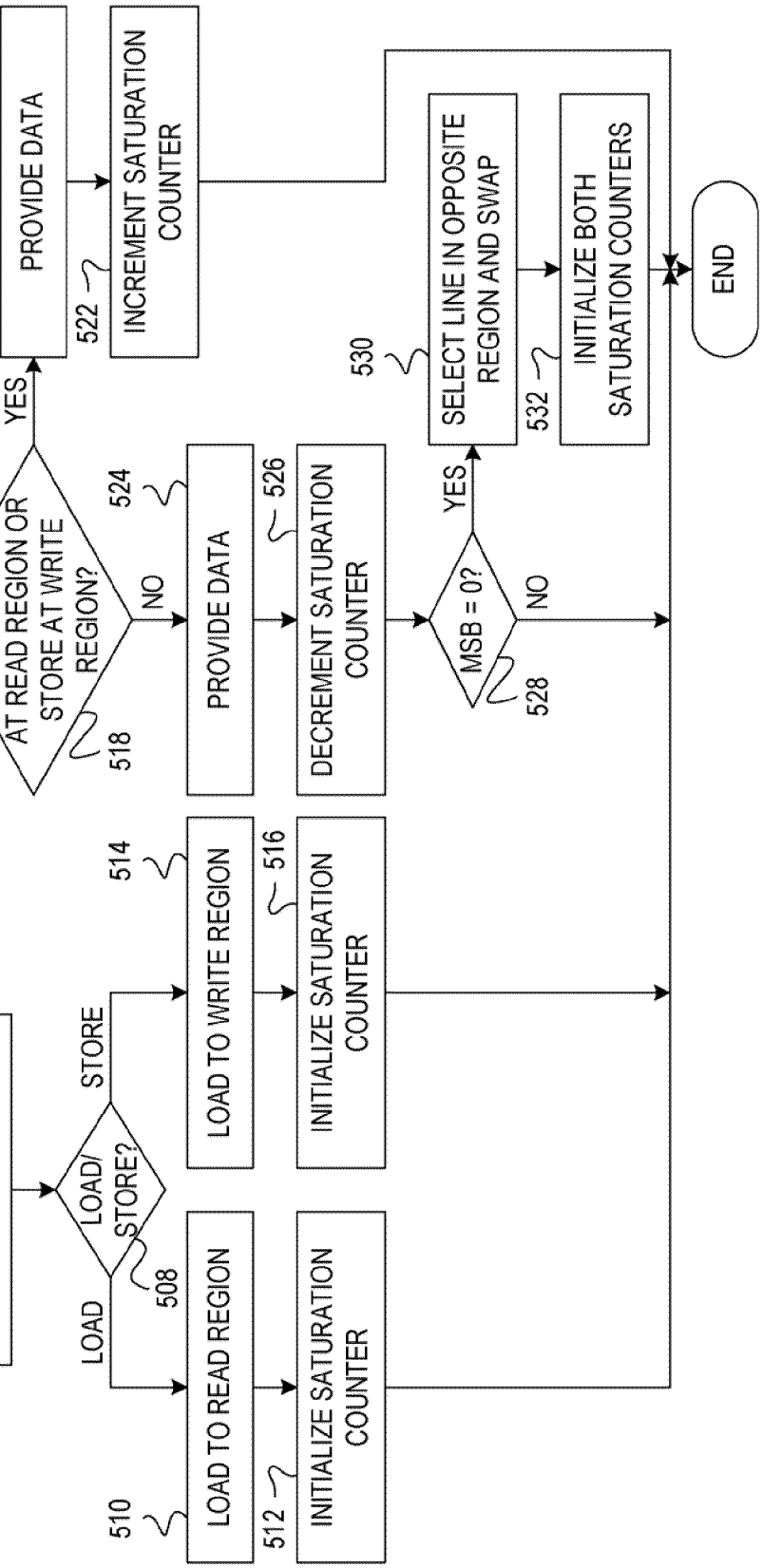
FIG. 5 is a flowchart illustrating operation of a cache controller for read- and write-aware cache in accordance with an illustrative embodiment.

FIG. 5 is a flowchart illustrating operation of a cache controller for read- and write-aware cache in accordance with an illustrative embodiment. Operation begins, and the cache controller receives a cache access request (block 502). The cache controller determines whether the cache access request results in a cache hit (block 504). If the cache access request does not result in a cache hit, the cache controller allocates a new cache line in the cache array (block 506). The cache controller then determines whether the cache access is a load or a store (block 508). If the cache access is a load, then the cache controller loads the cache line into the read-often region of the cache (block 510) and initializes a saturation counter for the cache line (block 512). Thereafter, operation ends. If the cache access is a store in block 508, then the cache controller loads the cache line into the write-often region of the cache (block 514) and initializes a saturation counter for the cache line (block 516). Thereafter, operation ends.

In accordance the illustrative embodiment, the saturation counter determines whether the cache line is in the correct region. In alternative embodiments, one or more counters may be used to determine read/write frequency. For example, a single counter may be used and may be incremented for a read and decremented for a write. In another example, the cache controller may keep separate read and write counters. Furthermore, in alternative embodiments, the cache controller may weight reads and writes differently by adjusting the increment/decrement weight or by comparing read and write counters to different thresholds, for example.

Returning to FIG. 5, if the cache access request results in a hit in block 504, the cache controller determines whether the cache access is a load at the read-often region or a store at the write-often region (block 518). In other words, in block 518 the cache controller determines whether the cache access corresponds with the region in which the cache line is allocated. If the cache controller determines that the cache access is a load at the read-often region or a store at the write-often region, then the cache controller provides the data from the cache line (block 520) and increments the saturation counter associated with the cache line (block 522). Thereafter, operation ends.

If the cache access is not a load at the read-often region and is not a store at the write-often region in block 518, then the cache access is a store at the read-often region or a load at the write-often region, and the cache access does not correspond with the region in which the cache line is allocated. In this case, the cache controller provides the data from the cache line (block 524) and decrements the saturation counter associated with the cache line (block 526). Then, the cache controller determines whether the most significant bit (MSB) of the saturation counter is zero (block 528).

In the depicted example, if the MSB of the saturation counter is not zero, then the cache line is in the correct region, and the operation ends. If the MSB of the saturation counter is zero in block 528, then the cache line is not in the correct region. In this case, the cache controller selects a cache line in the opposite region and swaps the current cache line with the selected cache line (block 530). The cache controller then initializes the saturation counters associated with the swapped cache lines (block 532), and the operation ends.

Thus, the illustrative embodiments provide mechanisms for providing a read and write aware cache. The mechanism partitions a large cache into a read-often region and a write-often region. The mechanism considers read/write frequency in a non-uniform cache architecture replacement policy. A frequently written cache line is placed in one of the farther banks. A frequently read cache line is placed in one of the closer banks. The size ratio between the read-often and write-often regions may be static or dynamic. The boundary between the read-often region and the write-often region may be distinct or fuzzy.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for read- and write-aware cache, the method comprising:
   receiving a cache access request in a cache controller from a processing unit;
   if the cache access request is a load resulting in a cache miss, the cache controller loads a cache line of data into a read-often region of a cache, wherein the cache comprises an array of banks and wherein the read-often region comprises banks that are close in proximity to the processing unit;
   if the cache access request is a store resulting in a cache miss, the cache controller places the cache line of data into a write-often region of the cache, wherein the write-often region comprises banks that are far in proximity to the processing unit;
   initializing a saturation counter associated with the cache line;
   receiving a subsequent cache access request in the cache controller for accessing the cache line;
   responsive to the cache access request being a store at the read-often region or a load at the write-often region, decrementing the saturation counter;
   responsive to the saturation counter being less than a threshold, determining that the cache line is not in the correct region; and
   responsive to the cache line not being in the correct region, swapping the cache line with a cache line in the opposite region.

2. The method of claim 1, further comprising:
   receiving a subsequent cache access request in the cache controller for accessing the cache line; and
   responsive to the cache access request being a load at the read-often region or a store at the write-often region, incrementing the saturation counter.

3. The method of claim wherein a size ratio between the read-often region and the write-often region is static.

4. The method of claim 1, wherein a boundary between the read-often region and the write-often region is distinct.

5. An apparatus, in a data processing system, for read- and write-aware cache, the apparatus comprising:
- a processing unit;
- a cache array comprising an array of banks, wherein the array of banks comprises a read-often region and a write-often region, wherein the read-often region comprises banks in the array of banks that are close in proximity to a processing unit, and wherein the write-often region comprises banks in the array of banks that are far in proximity to the processing unit;
- a cache controller coupled to the cache array and the processing unit, wherein the cache controller is configured to;
- receive a cache access request from the processing unit;
- responsive to the cache access request being a load resulting in a cache miss, load a cache line of data into the read-often region;
- responsive to the cache access request being a store resulting in a cache miss, place a cache line of data into the write-often region of the cache;
- initialize a saturation counter associated with the cache line;
- receive a subsequent cache access request in the cache controller for accessing the cache line;
- decrement the saturation counter responsive to the cache access request being a store at the read-often region or a load at the write-often region;
- determine that the cache line is not in the correct region responsive to the saturation counter being less than a threshold; and
- swap the cache line with a cache line in the opposite region responsive to the cache line not being in the correct region.

6. The apparatus of claim 5, wherein the cache controller is further configured to:
- receive a subsequent cache access request in the cache controller for accessing the cache line; and
- responsive to the cache access request being a load at the read-often region or a store at the write-often region, increment the saturation counter.

7. The apparatus of claim 5, wherein a size ratio between the read-often region and the write-often region is static.

8. The apparatus of claim 5, wherein a boundary between the read-often region and the write-often region is distinct.

9. A computer program product comprising a non-transitory computer recordable medium having a computer readable program recorded thereon, wherein the computer readable program, when executed on a computing device, causes the computing device to:
- receive a cache access request in a cache controller from a processing unit;
- responsive to the cache access request being a load resulting in a cache miss, load, by the cache controller, a cache line of data into a read-often region of a cache, wherein the cache comprises an array of banks and wherein the read-often region comprises banks that are close in proximity to the processing unit;
- responsive to the cache access request being a store resulting in a cache miss, load, by the cache controller, a cache line of data into a write-often region of the cache, wherein the write-often region comprises banks that are far in proximity to the processing unit;
- initialize a saturation counter associated with the cache line;
- receive a subsequent cache access request in the cache controller for accessing the cache line;
- decrement the saturation counter responsive to the cache access request being a store at the read-often region or a load at the write-often region;
- determine that the cache line is not in the correct region responsive to the saturation counter being less than a threshold; and
- swap the cache line with a cache line in the opposite region responsive to the cache line not being in the correct region.

10. The computer program product of claim 9, wherein the computer readable program further causes the computing device to:
- receive a subsequent cache access request in the cache controller for accessing the cache line; and
- responsive to the cache access request being a load at the read-often region or a store at the write-often region, increment the saturation counter.

11. The computer program product of claim 9, wherein the computer readable program is stored in a computer readable storage medium in a data processing system and wherein the computer readable program was downloaded over a network from a remote data processing system.

12. The computer program product of claim 9, wherein the computer readable program is stored in a computer readable storage medium in a server data processing system and wherein the computer readable program is downloaded over a network to a remote data processing system for use in a computer readable storage medium with the remote system.

* * * * *